(12) United States Patent
Diepstraten et al.

(10) Patent No.: US 7,027,407 B2
(45) Date of Patent: Apr. 11, 2006

(54) METHOD AND DEVICE FOR ROBUST FALLBACK IN DATA COMMUNICATION SYSTEMS

(75) Inventors: Wilhelmus Diepstraten, Noord-Brabant (NL); Adriaan Kamerman, Nieuwegein (NL); Hendrik Moelard, Maarssen (NL)

(73) Assignee: Agere Systems Inc., Allentown, PA (US)

( * ) Notice: Subject to any disclaimer, the term of this patent is extended or adjusted under 35 U.S.C. 154(b) by 929 days.

(21) Appl. No.: 09/760,583

(22) Filed: Jan. 16, 2001

(65) Prior Publication Data

US 2001/0009555 A1 Jul. 26, 2001

(30) Foreign Application Priority Data

Jan. 19, 2000 (EP) .............................. 00300343

(51) Int. Cl.
*G01R 31/08* (2006.01)

(52) U.S. Cl. ....................................... 370/252; 370/468
(58) Field of Classification Search ................ 370/252, 370/253, 468, 470, 471, 473, 474, 338, 352; 455/63.1, 67.11, 67.13, 296
See application file for complete search history.

(56) References Cited

U.S. PATENT DOCUMENTS

| | | | | |
|---|---|---|---|---|
| 5,526,399 A | | 6/1996 | Kameda ..................... 379/58 |
| 5,696,903 A | * | 12/1997 | Mahany ..................... 709/228 |
| 5,912,921 A | * | 6/1999 | Warren et al. .............. 375/220 |
| 6,584,158 B1 | * | 6/2003 | Ito et al. ..................... 375/259 |
| 6,603,801 B1 | * | 8/2003 | Andren et al. .............. 375/147 |
| 6,697,348 B1 | * | 2/2004 | Chen et al. ................. 370/337 |
| 6,741,580 B1 | * | 5/2004 | Kim et al. ................... 370/337 |
| 2001/0009555 A1 | * | 7/2001 | Diepstraten et al. ........ 370/468 |
| 2003/0037158 A1 | * | 2/2003 | Yano et al. ................. 709/232 |

FOREIGN PATENT DOCUMENTS

EP 0 963 051 A2 5/1999

OTHER PUBLICATIONS

Benny Bing, Measured Performance of the IEEE 802.11 Wireless LAN, Oct. 18–20, 1999, IEEE Conference, pp. 34–42 of Local Computer Networks.*
A. Kamerman, et al, "WaveLAN –II: A High–Performance Wireless LAN for the Unlicensed Band" "Bell Labs Technical Journal, vol. 2, No. 3, Jun. 21, 1997", pp. 118–133.
European Search Report, dated Aug. 4, 2000.

* cited by examiner

*Primary Examiner*—Ricky Ngo
*Assistant Examiner*—Christine Ng

(57) ABSTRACT

Method and device for communicating at least one packet of data with a predetermined packet size over a communication channel from a transmitter to a receiver, the transmitter having a memory for storing a common set of data rates, the method including the steps of fragmenting the at least one packet into a number of frames with a predetermined frame size by the transmitter, automatically selecting a combination of frame size and one of the common set of data rates by the transmitter such that the transmission time of each of the frames is limited to a predefined value, and transmitting each frame over the communication channel by the transmitter.

29 Claims, 1 Drawing Sheet

METHOD AND DEVICE FOR ROBUST FALLBACK IN DATA COMMUNICATION SYSTEMS

FIELD OF THE INVENTION

The present invention relates to a method for data communication between devices able to operate at various data rates, and more specifically relates to a method for providing a robust fallback facility for environments in which periodic or intermittent interference occurs.

DESCRIPTION OF THE RELATED ART

Non-prepublished European patent application 99302624.2, filed by applicant of the present patent application, discloses a method for enhanced data rate control for wireless data communication. The method selects a data rate for a communication channel between first and second devices having a set of common data rates by selecting an initial data rate from the set and adjusting the data rate responsive to a change in channel conditions. This method provides an auto rate control mechanism which can determine the best usable data rate for a given channel condition. The selection of an increase or decrease in data rate can be based on whether a packet is transmitted successfully or unsuccessfully, respectively.

In certain environments, e.g. the 2.4–2.5 GHz industrial, scientific and medical (ISM) band used in wireless LAN communication, the operation of radio systems for data communication in this band can be subject to interference by radio systems and unintentional radiators. In the ISM band radio systems such as RF ID (radio frequency identification tag and labelling) systems and Bluetooth systems operate, and unintentional radiators covering the ISM band may be e.g. microwave ovens.

In the known method, described above, the data rate of the communication uses a fallback scheme in the event of presence of interference. The data rate is reduced as this provides more robustness against background interference and channel degradation by signal reflection (echoes, delay spread, also known as inter symbol interference ISI).

However, when using a lower data rate, the transmission time of a packet will become larger. Such a larger transmission time will result in a higher probability that the transmission of the packet will be exposed to interference from periodical transmissions at the same frequency, e.g. from the above mentioned radio systems and unintentional radiators, leading to loss of the packet sent. The fall back scheme will therefore be counter productive in the presence of periodic or intermittent interference.

Another method of providing a more robust system for data communication is the use of fragmentation. Packets of data are fragmented in shorter duration frames, which are assembled to the original packet at the receiving device. This also provides robustness against interference and degradation of the data communication channel.

Using fragmentation will shorten the transmission time, but will not provide a more robust transmission with respect to background interference, echo and ISI, as these are continuous interference sources and the influence of these interferences is greatly dependent on the data rate, as explained above. Also, fragmentation will lead to more overhead needed to transmit a complete data packet, thereby reducing the throughput percentage of the system.

A communication method that is more robust with respect to all kinds of interference than the methods described above is needed.

SUMMARY OF THE INVENTION

This invention may be implemented as a method for communicating at least one packet of data with a predetermined packet size over a communication channel from a transmitter to a receiver, the transmitter having a memory for storing a common set of data rates, the method comprising the steps of fragmenting the at least one packet into a number of frames with a predetermined frame size by the transmitter, automatically selecting a combination of frame size and one of the common set of data rates by the transmitter such that the transmission time of each of the frames is limited to a predefined value, and transmitting each frame over the communication channel by the transmitter.

The method according to the present invention has the advantage that the possibility of periodic interference and transmission of a frame occurring at the same time is limited to a predefined value, thus resulting in a greater chance of successful transmission of data packets.

In an embodiment of the method according to the present invention, the predefined value of frame transmission time is determined by characteristics of interference in the communication channel. The predefined value of transmission time may be selected based on the expected interference characteristics. Alternatively, a measurement of interference present in the communication channel may be used for selecting a predefined value of frame transmission time.

In a further embodiment, the combination of frame size and data rate is changed dependent on the condition of the communication channel. This may be based on expectation or measurement of the communication channel condition. In a preferred embodiment, the condition of the communication channel is determined based on success of transmission of each of the frames. After failure of transmitting a packet, a lower data rate (combined with a certain fragmentation size) may be selected, and after a number of successful transmissions, it may be assumed that the channel condition allows a higher data rate (combined with a larger frame size, or no fragmentation at all).

In an embodiment according to the present invention, the success of transmission of each of the frames is determined after a predetermined number of retries. When a data frame has been sent over the communication channel from a first device to a second device, the second device should acknowledge receipt of the data frame, within a specified time period. When an acknowledge message is not received by the first device within the specified time period, the first device may retransmit the same data frame. In implementations of the IEEE 802.11 standard, the number of retries allowed is in general limited. Only after not receiving a specified number of acknowledge messages, the method will change the combination of data rate and fragmentation size.

When using wireless LAN communication according to the IEEE 802.11 standard (including extensions 11a and 11b), the set of common data rates is 11 Mbit/s; 5.5 Mbit/s; 2 Mbit/s and 1 Mbit/s. For a typical maximum payload format in present wireless LAN networks with an Ethernet backbone, the typical packet size is 1500 byte. The preferred set of frame sizes comprises 1500 bytes; 750 bytes; 500 bytes; 256 bytes and 128 bytes.

In the presence of microwave ovens, the predefined value of the transmission time is 4.5 msec. This will limit the probability that a data frame sent by the first device experiences broadband interference from the microwave oven (5–8 msec bursts every 16 or 20 msec) to a very low value.

In the presence of Bluetooth systems, the predefined value of the transmission time is 1.5 msec. This will limit the probability that a data frame sent by the first device experiences interference from the Bluetooth transmitters, which radiate in 0.366 msec bursts every 3.75 msec on one specific frequency.

In a second aspect, the present invention relates to a device for receiving or transmitting at least one packet of data with a predetermined packet size over a communication channel between the device and a second device, the device comprising a processor and memory means connected to the processor for storing a common set of data rates, the processor being arranged to fragment the at least one packet into a number of frames with a predetermined frame size, automatically select a combination of frame size and one of the common set of data rates such that the transmission time of each of the frames is limited to a predefined value, and transmit each frame over the communication channel.

The method according to the present invention may be implemented in such a device, the device being part of an apparatus transmitting data packets, e.g. in the medium access control chipsets of a wireless LAN network adapter card.

In a further aspect, the present invention relates to a computer program comprising computer readable instructions, which comprise method steps for controlling a transmitter communicating at least one data packet with a predetermined packet size over a communication channel, the transmitter having memory means for storing a common set of data rates, by fragmenting the at least one packet into a number of frames with a predetermined frame size by the transmitter, automatically selecting a combination of frame size and one of the common set of data rates by the transmitter such that the transmission time of each of the frames is limited to a predefined value, and transmitting each frame over the communication channel by the transmitter.

BRIEF DESCRIPTION OF THE DRAWINGS

The present invention will now be described in more detail with reference to exemplary embodiments, with reference to the accompanying drawings, in which.

DETAILED DESCRIPTION OF THE PREFERRED EMBODIMENT

The present invention will be discussed in relation with a specific application of data communication between a first device and a second device using a communication channel, e.g. wireless LAN communication using the IEEE 802.11 standard for wireless systems operating in the 2.4–2.5 GHz industrial, scientific and medical (ISM) band.

Figure 1A:
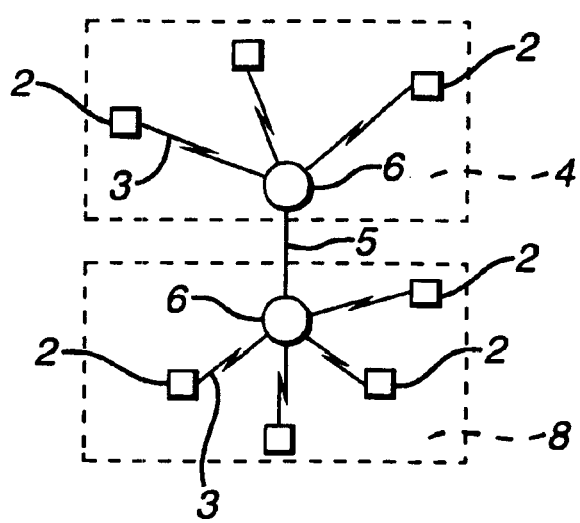
FIGS. 1a and 1b show network situations in which a method according to the present invention may be implemented.
Figure 1B:
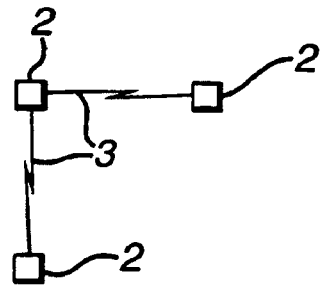

FIG. 1a shows a network situation in access point based networks, in which a method according to the present invention may be implemented. A number of stations 2, or data communication devices, in a cell or group 4 can communicate only directly to an access point 6, e.g. via a wireless connection 3. The access point 6 forwards messages to a destination station 2 within the same cell 4, or through a wired connection 5 to another access point 6 in a further cell 8. From the further access point 6, the messages finally arrive at the destination station 2. FIG. 1b shows an ad-hoc network, in which the stations 2 communicate on a peer-to-peer level via direct communication channels 3. Both the stations 2 and the access points 6 are able to communicate bi-directionally over the communication channel 3. Most of the communication channels 3 may be formed by a wireless connection between multiple stations 2 or between a station 2 and an access point 6, as described above. Alternatively, the communication channel 3 may be implemented as a wired connection, e.g. between two access points 6.

Figure 2:
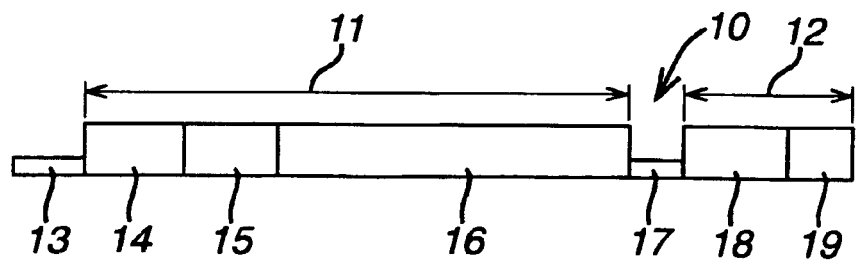
FIG. 2 shows a data packet or frame structure according to the IEEE 802.11 standard.

FIG. 2 shows a typical structure 10 of a data packet or data frame according to the IEEE 802.11 wireless LAN standard. A transmission of a data packet or frame 11 is preceded by a DCF (distributed coordination function) inter frames spacing, DIFS, 13. The data packet or frame 11 comprises a physical layer overhead 14, a.o. for synchronization purposes, a medium access control (MAC) header 15, and the actual data payload 16. After receipt of the data packet 11, the receiving device will wait a predetermined period, or single inter frame spacing SIFS 17, before sending an acknowledge frame 12 to the first device. The acknowledge frame 12 also comprises a physical layer overhead 18, a.o. for synchronization purposes, and a MAC overhead 19.

The ISM band can be used world-wide and allows unlicensed operation for spread spectrum systems. The IEEE 802.11 standard focuses on the medium access control (MAC) layer and physical layer (PHY) protocols for access point based networks and ad-hoc networks.

The IEEE 802.11 standard supports direct sequence spread spectrum (DSSS) with differential encoded BPSK and QPSK, frequency hopping spread spectrum (FHSS) with Gaussian frequency shift keying (GFSK) and infrared with pulse position modulation (PPM). The three physical layers (DSSS, FHSS and infrared) are all based on bit rates of 2 and 1 Mbit/s. Extensions are being proposed for higher bit rates for the various physical layers, extension 11b being directed at DSSS providing bit rates of 5.5 and 11 Mbit/s and extension 11a being directed at orthogonal frequency division multiplexing (OFDM) providing bit rates in the range of 6 to 54 Mbit/s in the 5 GHz band.

The IEEE 802.11 standard allows interoperability between compatible physical layers as the medium access control layer allows use of carrier sense multiple access with collision avoidance (CSMA/CA). Also, all directed data traffic uses immediate positive acknowledgement (through an acknowledge frame 12, ACK) and a retransmission is scheduled by the sender if no ACK frame 12 is received. The MAC layer of IEEE 802.11 defines special functional behaviour for fragmentation of packets.

As the 2.4–2.5 GHz ISM band provides an unlicensed spectrum, operation of radio systems in this band can be subject to interference from other radio systems and unintentional radiators. In the ISM band, radio systems, such as Bluetooth systems and RF ID systems (radio frequency identification tag and labelling systems), and also unintentional radiators, such as microwave ovens, are operating.

According to the IEEE 802.11 standard, it is possible to use a fallback in data rate when packets are lost after a few attempts by retransmitting the packets, to provide more robustness against background interference and channel degradation by signal reflection, such as echoes and or delay spread (also referenced as inter symbol interference, ISI) caused by multipath interference. Lower data rates are more robust against these types of continuous interference, and an automatic fallback and fall forward in data rate will result in a self adjusting data rate behavior. In non-prepublished European patent application 99302624.2, filed by applicant of the present patent application, a method for enhanced data rate control for wireless data communication is disclosed. The method selects a data rate for a communication channel 3 between first and second devices 2 having a set of common data rates by selecting an initial data rate from the set and adjusting the data rate responsive to a change in channel conditions. This method provides an auto rate control mechanism which can determine the best usable data rate for a given channel condition. The selection of an increase or decrease in data rate can be based on whether a packet is transmitted successfully or unsuccessfully, respectively.

By lowering the data rate (automatic or otherwise), the packets will take a longer time to be transmitted. When in the communication channel 3 interference is present which exhibits a periodic nature (e.g. short duration bursts), the longer time needed to transmit a packet will result in a higher risk that the packet transmitted will be mutilated by the periodic interference, leading to possible loss of the transmitted packet.

Therefore, the fallback in data rate will be counter productive in the presence of periodic interference, e.g. from nearby Bluetooth devices, which exhibit a transmission activity during 0.366 msec bursts every 3.75 msec. Bluetooth uses a frequency hopping transmission mode, in which a transmitter is active during 0.366 msec bursts in a time slot of 0.625 msec at a single specific frequency. During the next five time slots, the transmitter has no transmission activity. The hopping scheme of Bluetooth devices results in a transmission on a single specific frequency during 0.366 msec of a 0.625 msec slot time. This is followed by transmissions in the next slot times on other frequencies from the set of 79 frequencies (f=2402+k MHz, k=0 . . . 78) according to a random-like hop pattern, and then again on the first single specific frequency.

Also in the presence of microwave ovens, the communication channel 3 may be exposed to periodic interference. Microwave ovens emit microwave energy in a frequency band of several MHz wide, in bursts of 5–8 msec during every 16 or 20 msec cycle (the 16 msec cycle being present in microwave ovens operating at 60 Hz mains, and the 20 msec cycle being present in microwave ovens operating at 50 Hz mains).

The time periods of the data packet or data frame 11 according to the IEEE 802.11 standard using direct sequence spread spectrum (DSSS) techniques will now be described. The data packet or frame 11 is preceded by a DCF (distributed coordination function) inter frame spacing 13 (DIFS) of 50 μsec, regardless of the data rate. The data packet or frame 11 starts with a physical layer overhead (PHY) 14, or preamble/ header, which is also independent on the data rate used and takes 192 μsec. According to the IEEE 802.11 standard, it is possible to use a short preamble/header 14 in the high speed variants (5.5 and 11 Mbit/s) of only 96 μsec. The next block is the medium access control (MAC) overhead 15, which is dependent on the data rate used. Next, the data payload 16 is included in the structure 10, and the time thereof depends on the payload size and the data rate.

After the data payload 16, a short inter frame spacing 17 (SIFS) of 10 μsec is present and precedes an acknowledge (ACK) frame 12. This acknowledge frame 12 comprises a physical layer (PHY) overhead 18 of 192 μsec (96 μsec in the case of short preamble/header at high speeds) which is independent on data rate, and a medium access control overhead 19 of 112 μsec (1 Mbit/s data rate) or 56 μsec (other data rates).

In the following table, the transmission times (in μsec) of the components of a packet of 1500 bytes are shown for different data rates. A packet size of 1500 byte is a typical maximum payload for present wireless LAN networks with an Ethernet backbone, e.g. as used for file transfer. For the higher speeds (5.5 and 11 Mbit/s) it is possible to use a short preamble/header, as indicated by (sh.pr.) in the table.

TABLE 1

| | | DATA (μsec) | | | | ACK (μsec) | | | | |
|---|---|---|---|---|---|---|---|---|---|---|
| bit rate (MHz) | DIFS (μsec) | PHY preamble/ header | MAC over- head | data | SIFS (μsec) | PHY preamble/ header | MAC over- head | total (μsec) | through- put (Mbit/s) | Through- put percentage |
| 1 | 50 | 192 | 272 | 12000 | 10 | 192 | 112 | 12828 | 0.94 | 93.5 |
| 2 | 50 | 192 | 136 | 6000 | 10 | 192 | 56 | 6636 | 1.81 | 90.4 |
| 5.5 | 50 | 192 | 49 | 2182 | 10 | 192 | 56 | 2732 | 4.39 | 79.8 |
| 11 | 50 | 192 | 25 | 1091 | 10 | 192 | 56 | 1616 | 7.43 | 67.5 |
| 5.5 (sh.pr.) | 50 | 96 | 49 | 2182 | 10 | 96 | 56 | 2542 | 4.72 | 85.8 |
| 11 (sh.pr.) | 50 | 96 | 25 | 1091 | 10 | 96 | 56 | 1424 | 8.43 | 76.6 |

For fragmented data packets 11, the same structure is used, but the size of the data payload 16 becomes smaller, and hence the total transmission time of the data frame. Because of all overhead parts in the structure 10, the total transmission time of the original data packet will naturally increase.

According to the present invention, the medium access control scheme provides a fallback (resp. fall forward) in bit rate in combination with fragmentation of packet data payload in frames in order to limit the transmission time. Preferably, the limit of frame transmission time is configurable and selected from a set of alternatives. The recommended setting may be based on the type and characteristic of the interference that can be expected. Alternatively, means may be provided to measure the characteristics of interference that is present in the communication channel 3.

In an environment where IEEE 802.11 communication systems 2, 6 operate collocated with Bluetooth systems, the set of alternative combinations of data rate and frame size is preferably as follows:

11 Mbit/s; no fragmentation;
5.5 Mbit/s; fragmentation in frames of maximum 750 bytes;
2 Mbit/s; fragmentation in frames of maximum 256 bytes;
1 Mbit/s; fragmentation in frames of maximum 128 bytes.

This will result in a maximum frame transmission time of about 1.5 msec or less and will make the IEEE 802.11 communication more robust against Bluetooth interference, as this interference occurs in active periods of 0.366 msec each 3.75 msec on one single frequency.

In an environment where IEEE 802.11 communication systems 2, 6 operate with microwave ovens operating nearby systems, the set of alternative combinations of data rate and frame size is as follows:

11 Mbit/s; no fragmentation;
5.5 Mbit/s; no fragmentation;
2 Mbit/s; fragmentation in frames of maximum 750 bytes;
1 Mbit/s; fragmentation in frames of maximum 500 bytes;

This will result in a maximum frame transmission time of about 4.5 msec or less and will make the IEEE 802.11 communication more robust against interference from nearby microwave ovens, as this interference occurs in active periods of 5–8 msec each 16 (60 Hz operation) or 20 msec (50 Hz operation).

Lowering the transmission time for a data frame to much lower levels (e.g. by using a higher data rate or higher degree of fragmentation) will not drastically further reduce the probability that transmission of a data frame will be interfered by the periodic or intermittent interfering signals.

The fallback in data rate in combination with fragmentation of the data packet into data frames may only occur for a complete data packet, as the IEEE 802.11 standard does not allow change of fragmentation size or data rate during transmission of a data packet which is fragmented into smaller data frames. Change of fragmentation size during transmission of a number of data frames would disturb the defragmentation process at the receiving device. Therefore, a fallback (or fall forward) in combination of data rate and fragmentation size should only be executed at the start of transmission of the next data packet.

In normal operation according to the IEEE 802.11 standard, a retransmission will be attempted by the sending device 2, when no acknowledgement is received from the receiver after sending a data frame or packet. After a number of retries for sending the data frame or packet, it is assumed that the communication channel 3 is unsuited for transmission at that specific data rate, and a fallback option in data rate, e.g. as disclosed in non-prepublished European patent application 99302624.2, is applied to provide a communication channel 3 which is more robust. When the communication channel 3 is already being operated at its lowest data rate, a control message may be generated, indicating that the present communication channel 3 is unsuited for transmission of data packets.

In the case of intermittent or periodic interference, such as from the Bluetooth systems mentioned above, it would be advantageous to allow a larger number of retries for transmitting a data frame or packet 11. This would allow "shifting" the transmission time of the data frame or packet to the period between active interference periods, still enabling interference free transmission at the higher data rate.

The method according to the present invention thus provides an automatic selection of the combination of data rate and fragmentation size, resulting in a system which is much more robust in the presence of bursty interference. The throughput in absence of interference is not affected, as in that situation the highest data rate with no fragmentation will be selected.

Figure 3:
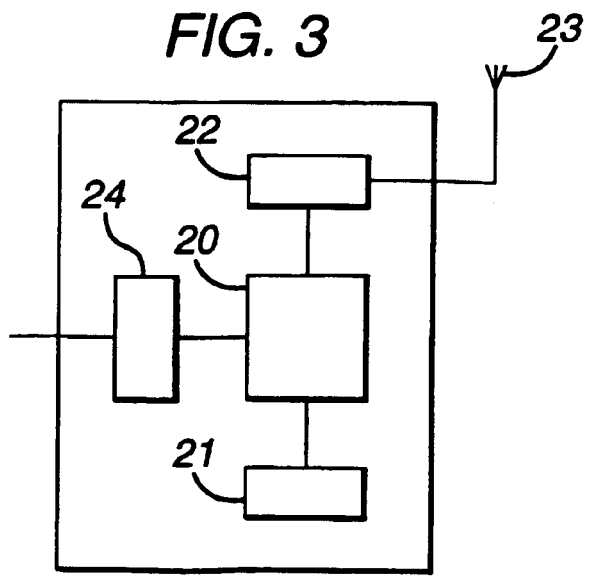
FIG. 3 shows a diagrammatic view of a device according to an embodiment of the present invention.

In FIG. 3, a diagrammatic view is shown of a device according to an embodiment of the present invention. The device may be part of any of the stations 2 or access points 6 described with reference to FIG. 1a and 1b. The device comprises a microprocessor 20 functioning as a control unit of the device. The microprocessor 20 is connected to memory means 21, such as random access memory, read-only memory or non-volatile memory. The microprocessor 20 is also connected to receiver/transmitter 22, which in its turn is connected to an antenna 23. Finally, the microprocessor 20 is also connected to an interface 24, for communicating with a host device, such as a computer (not shown). According to an embodiment of the present invention, the microprocessor 20 is arranged to execute the method of the present invention as described above. The set of common data rates and the set of fragmentation packets, and the preferred combinations of data rate and fragmentation size may be stored in the memory means 21.

The components of the device may, e.g., form part of an IEEE 802.11 wireless LAN network adapter card. Then, the microprocessor 20 may be formed by the medium access control chipset on the network adapter card.

Above, the present invention has been illustrated with reference to a number of exemplary embodiments. However, these are given to illustrate the present invention and not to limit the scope of protection as defined by the accompanying claims.

What is claimed is:

1. An automated method for communicating packets of data with predetermined packet sizes over a communication channel from a transmitter to a receiver, the automated method comprising:

(a) characterizing initial interference in the communication channel;

(b) selecting a first maximum frame transmission time based on the characterized initial interference;

(c) selecting a first data rate and a first frame size for a first packet based on the first maximum frame transmission time;

(d) fragmenting the first packet into one or more frames based on the first frame size;

(e) transmitting the one or more frames of the first packet at the first data rate, such that transmission duration of each frame of the first packet is less than the first maximum frame transmission time;

(f) characterizing subsequent interference in the communication channel;

(g) selecting a second maximum frame transmission time based on the characterized subsequent interference, wherein the second maximum frame transmission time is different from the first maximum frame transmission time;

(h) selecting a second data rate and a second frame size for a second packet based on the second maximum frame transmission time;

(i) fragmenting the second packet into one or more frames based on the second frame size; and (j) transmitting the one or more frames of the second packet at the second data rate, such that transmission duration of each frame of the second packet is less than the second maximum frame transmission time.

2. The automated method of claim 1, wherein at least one of (i) the second data rate is different from the first data rate and (ii) the second frame size is different from the first frame size.

3. The automated method of claim 2, wherein the second data rate is the same as the first data rate.

4. The automated method of claim 2, wherein the second frame size is the same as the first frame size.

5. The automated method of claim 2, wherein (i) the second data rate is different from the first data rate and (ii) the second frame size is different from the first frame size.

6. The automated method of claim 1, wherein:
step (c) comprises selecting the first data rate and the first frame size from a first table of two or more combinations of data rates and frame sizes corresponding to the first maximum frame transmission time; and
step (h) comprises selecting the second data rate and the second frame size from a second table of two or more combinations of data rates and frame sizes corresponding to the second maximum frame transmission time, wherein the first table is different from the second table.

7. The automated method of claim 6, wherein:
the first table corresponds to the characterized initial interference; and
the second table corresponds to the characterized subsequent interference.

8. The automated method of claim 6, wherein:
the first table corresponds to an IEEE 802.11 communication system operating collocated with an operating Bluetooth system; and
the second table corresponds to the IEEE 802.11 communication system operating near one or more operating microwave ovens.

9. The automated method of claim 1, further comprising the steps of:
(k) selecting a third data rate and a third frame size for a third packet based on the second maximum frame transmission time, wherein the third data rate is different from the second data rate;
(l) fragmenting the third packet into one or more frames based on the third frame size; and
(m) transmitting the one or more frames of the third packet at the third data rate, such that the transmission duration of each frame of the third packet is less than the second maximum frame transmission time.

10. The automated method of claim 9, wherein:
steps (k)–(m) are implemented after determining that transmission of the one or more frames of the second packet at the second data rate was not successful; and
the third data rate is lower than the second data rate.

11. The automated method of claim 10, wherein the third frame size is the same as the second frame size.

12. A transmitter for communicating packets of data with predetermined packet sizes over a communication channel to a receiver, the transmitter comprising a processor and a memory connected to the processor and adapted to store different combinations of data rates and frame sizes, the processor adapted to:
(a) characterize initial interference in the communication channel;
(b) select a first maximum frame transmission time based on the characterized initial interference;
(c) select a first data rate and a first frame size for a first packet based on the first maximum frame transmission time;
(d) fragment the first packet into one or more frames based on the first frame size, wherein the transmitter is adapted to transmit the one or more frames of the first packet at the first data rate, such that transmission duration of each frame of the first packet is less than the first maximum frame transmission time;
(e) characterize subsequent interference in the communication channel;
(f) select a second maximum frame transmission time based on the characterized subsequent interference, wherein the second maximum frame transmission time is different from the first maximum frame transmission time;
(g) select a second data rate and a second frame size for a second packet based on the second maximum frame transmission time;
(h) fragment the second packet into one or more frames based on the second frame size, wherein the transmitter is adapted to transmit the one or more frames of the second packet at the second data rate, such that transmission duration of each frame of the second packet is less than the second maximum frame transmission time.

13. The transmitter of claim 12, wherein at least one of (i) the second data rate is different from the first data rate and (ii) the second frame size is different from the first frame size.

14. The transmitter of claim 13, wherein the second data rate is the same as the first data rate.

15. The transmitter of claim 13, wherein the second frame size is the same as the first frame size.

16. The transmitter of claim 13, wherein (i) the second data rate is different from the first data rate and (ii) the second frame size is different from the first frame size.

17. The transmitter of claim 12, wherein the processor is adapted to:
select the first data rate and the first frame size from a first table of two or more combinations of data rates and frame sizes corresponding to the first maximum frame transmission time; and
select the second data rate and the second frame size from a second table of two or more combinations of data rates and frame sizes corresponding to the second maximum frame transmission time, wherein:
the first table is different from the second table; and
the first and second tables are stored in the memory.

18. The transmitter of claim 17, wherein:
the first table corresponds to the characterized initial interference; and
the second table corresponds to the characterized subsequent interference.

19. The transmitter of claim 17, wherein:
the first table corresponds to an IEEE 802.11 communication system operating collocated with an operating Bluetooth system; and
the second table corresponds to the IEEE 802.11 communication system operating near one or more operating microwave ovens.

20. The transmitter of claim 12, wherein the processor is further adapted to:
(i) select a third data rate and a third frame size for a third packet based on the second maximum frame transmission time, wherein the third data rate is different from the second data rate;
(j) fragment the third packet into one or more frames based on the third frame size, wherein the transmitter is adapted to transmit the one or more frames of the third packet at the third data rate, such that the transmission duration of each frame of the third packet is less than the second maximum frame transmission time.

21. The transmitter of claim 20, wherein:
the processor is adapted to implement the selection of (i) and the fragmentation of (j) after determining that transmission of the one or more frames of the second packet at the second data rate was not successful; and
the third data rate is lower than the second data rate.

22. The transmitter of claim 21, wherein the third frame size is the same as the second frame size.

23. A transmitter for communicating packets of data with predetermined packet sizes over a communication channel to a receiver, the transmitter comprising:
a memory adapted to store a plurality of different tables, each table comprising two or more combinations of data rates and frame sizes and each table corresponding to a different maximum frame transmission time; and
a processor adapted to:
(a) characterize interference in the communication channel;
(b) select a first table of the plurality of tables based on the characterized interference;
(c) select, from the first table, a first combination of a first data rate and a first frame size for a first packet; and
(d) fragment the first packet into one or more frames based on the first frame size, wherein the transmitter is adapted to transmit the one or more frames of the first packet at the first data rate, such that transmission duration of each frame of the first packet is less than the maximum frame transmission time corresponding to the first table.

24. The transmitter of claim 23, wherein:
the first table further comprises a second combination of a second data rate and a second frame size;
the first data rate is different from the second data rate; and
the first frame size is the same as the second frame size.

25. The transmitter of claim 23, wherein the processor is further adapted to:
(e) select, from the first table, a second combination of a second data rate and a second frame size for a second packet; and
(f) fragment the second packet into one or more frames based on the second frame size, wherein the transmitter is adapted to transmit the one or more frames of the second packet at the second data rate, such that the transmission duration of each frame of the second packet is less than the maximum frame transmission time corresponding to the first table.

26. The transmitter of claim 25, wherein:
the processor is adapted to implement the selection of (e) and the fragmentation of (f) after determining that transmission of the one or more frames of the first packet at the first data rate was not successful; and
the second data rate is lower than the first data rate.

27. The transmitter of claim 26, wherein the second frame size is the same as the first frame size.

28. The transmitter of claim 23, wherein the processor is further adapted to:
(e) re-characterize the interference in the communication channel;
(f) select a second table of the plurality of tables based on the re-characterized interference;
(g) select, from the second table, a second combination of a second data rate and a second frame size for a second packet; and
(h) fragment the second packet into one or more frames based on the second frame size, wherein:
the transmitter is adapted to transmit the one or more frames of the second packet at the second data rate, such that the transmission duration of each frame of the second packet is less than the maximum frame transmission time corresponding to the second table; and
the maximum transmission time corresponding to the second table is different from the maximum transmission time corresponding to the first table.

29. The transmitter of claim 28, wherein:
the first table corresponds to an IEEE 802.11 communication system operating collocated with an operating Bluetooth system; and
the second table corresponds to the IEEE 802.11 communication system operating near one or more operating microwave ovens.

* * * * *